Sept. 8, 1959 L. J. PERAS 2,903,044
VEHICLE SEATS
Filed July 7, 1954 2 Sheets-Sheet 1
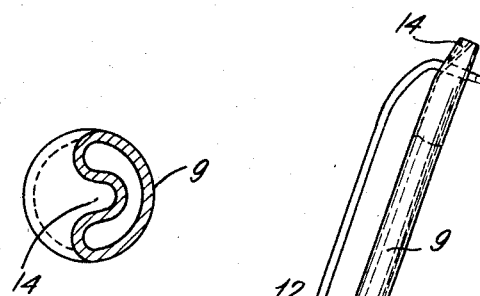
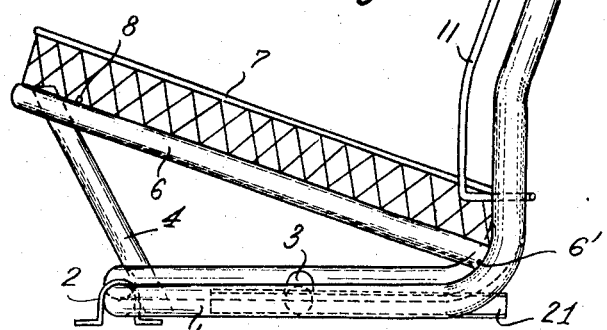
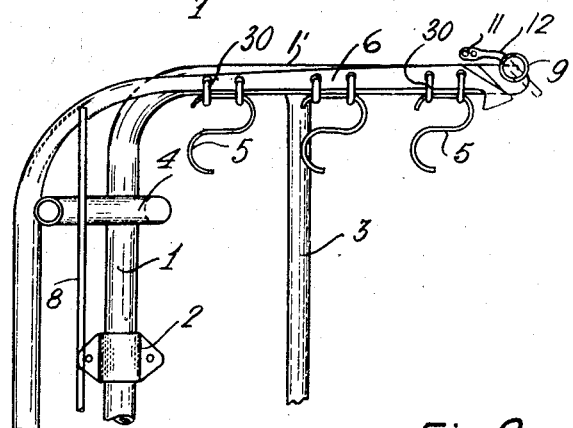

Sept. 8, 1959　　　　　L. J. PERAS　　　　2,903,044
VEHICLE SEATS
Filed July 7, 1954　　　　　　　　　2 Sheets-Sheet 2

United States Patent Office 2,903,044
Patented Sept. 8, 1959

2,903,044

VEHICLE SEATS

Lucien Jules Peras, Billancourt, France, assignor to Regie Nationale des Usines Renault, Billancourt, France, French works under the control and the authority of the French Government Application July 7, 1954, Serial No. 441,823

Claims priority, application France July 22, 1953

3 Claims. (Cl. 155—9)

The invention relates to seats and more particularly to seats mounted in automobile vehicles, and is concerned with improvements in the construction of the said seats consisting in providing a seat framework which is itself elastic and which, by means of elastic deformation of the said framework and more especially of the back portion thereof, improves the comfort of the passengers.

The problem of vehicle seats cannot be compared to that of fixed seats. The striving to achieve comfort, combined with the striving after lightness and low cost price, has led to the adoption of solutions which compromise between conditions which are often contradictory.

On the one hand the softness and suppleness of vehicle seats require great quantities of good and durable material for suitably absorbing and damping the movements transmitted to the passengers by uneven road conditions and imperfections in the suspension proper of the chassis or of the body. On the other hand, the anxiety to achieve lightness and low cost price limits the quantity and quality of the elements, and therefore the materials, of the said seats.

The invention relates to a new type of seat characterised principally in that the framework of the seat is constructed as an elastic element, contributing to the suppleness and comfort of the seat.

It has been admitted up to the present time that the seats of automobile vehicles were constituted by a rigid frame particularly resistant to deformations which might be caused by inertia stresses. This frame was provided with an elastic suspension system constituted by springs and cushions of various textiles, wadding, rubber, etc.

In the arrangement which is the subject of the present invention, the elastic elements serving as supports for the springs and for the fittings of the seat may be, more particularly, the uprights of the frame forming the back portion, on condition however that the said uprights derive their elasticity from other elements of the seat which themselves exhibit a certain rigidity in the longitudinal direction.

A description of the present invention, applied to the seats of a vehicle, will now be given by way of non-limitative example and in order to make the subject of the invention more easily understood. It will of course be evident that the principle of the invention also covers bench seats on which several passengers may sit and to all other types of seats which use the metal framework employed on vehicles of any type, or even on fixed seats.

In the accompanying drawings:

Fig. 1 is a side view of the framework of a seat;

Fig. 2 is a fragmentary plan view of the said framework;

Fig. 4 is a sectional view showing by way of example the section which is given to the lateral uprights to allow the assembly of an elastic element which will be described hereinafter;

Figure 3:
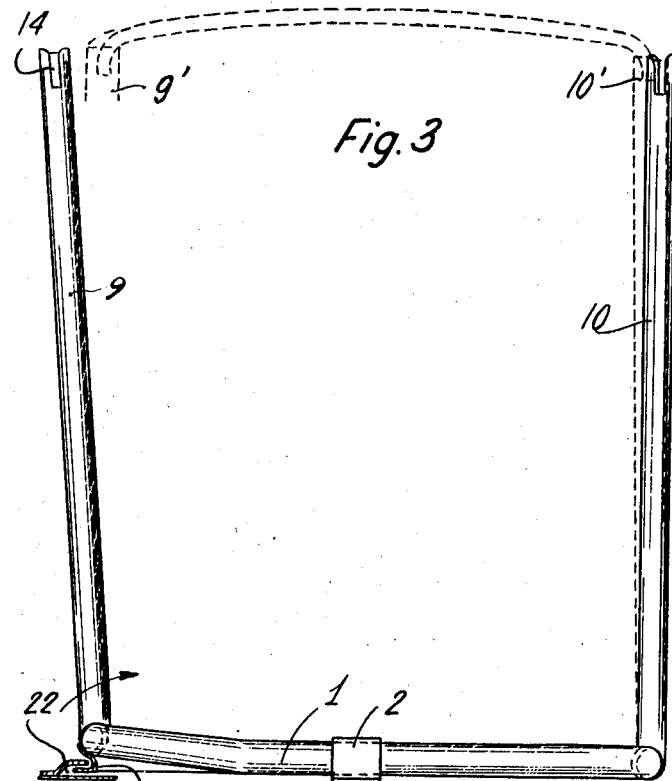
Fig. 3 is a view of the frame as seen from the front, that is from the direction in which the vehicle is travelling.

Referring to Figs. 1 to 3, it will be seen that the seat proper is constituted essentially by an approximately horizontal tube 1 which is bent in U-shape and is slightly raised at the left-hand side, as shown in Fig. 3, in order to receive a support step 21 capable of moving along a slide-way 22 to allow adjustment. The said elbowed tube 1 is prolonged in the vertical direction by elastic elements 9 and 10 which are formed by the prolongations of the tube 1 bent to extend along an approximately vertical plane.

Figs. 1 and 3 likewise show a collar 2 which allows the seat to be fixed to the interior of the coachwork. This collar, which is welded to the tube 1, has holes for receiving the shank of a butterfly nut, not shown, for fixing the seat in the adjusted position.

A cross strut 3 increases the rigidity of the elbowed tube 1, the arms of which might otherwise possibly be pushed apart under the influence of the inertia stresses from the passenger's body. This cross strut 3, which is shown in Fig. 2, is welded to the two lateral parts 1' of the U-shaped tube in order to maintain the correct distance therebetween.

Oblique elements 4, also consisting of tubes, connect the base formed by the tube 1 to the support 6 proper of the seat portion, the said support 6 likewise consisting of a tube bent into a U-shape and welded at the rear at 6' to the elements 1, and may be considered as lying in a single plane, which is slightly inclined towards the rear.

Figure 6:
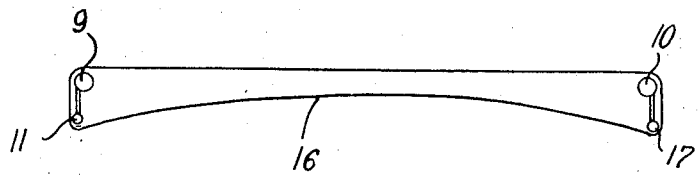
Fig. 6 is also a diagrammatic view, showing in horizontal section, the position of the cover fabric of the back which bears more particularly on the band shown in the preceding figure.

Disposed above tube 6 is a strip 7, bent in the manner of tube 6, to form a frame which supports the trim of the seat. Strip 7 is held at a convenient distance above support 6 by means of springs or a support of steel wire resting on the zig-zag springs 5, the support for strip 7 being indicated conventionally in Fig. 1 by cross hatching. A rod 8, which is used in hooking the trim fabric in place, rests upon and is welded to the two side portions of support 6. The strip 7 is complemented vertically by the rods 11 and 17 in dependence on the inclination of the back portion, as may be seen in the drawings (Figs. 1 and 6); these rods 11 and 17 are fixed by any suitable means to the elements 9 and 10. This fixing is moreover reinforced by means of ties such as 12; the whole assembly is of sufficient thickness to provide elasticity and more especially to produce an excellent appearance.

Finally, to complete the horizontal part of the seat, zig-zag springs 5 are disposed in known manner between the lateral parts of the support, to which they are fixed by means of pins 30 passing through suitable holes.

Referring now to the lateral uprights of the back portion 9 and 10, it will be observed that they are formed at their upper ends with a groove 14 which is shown in the horizontal sectional view of these uprights illustrated in Fig. 4. This groove 14 is formed by stamping the upper extremity of the tube, whose cylindrical surface is folded inwards as shown.

Figure 5:
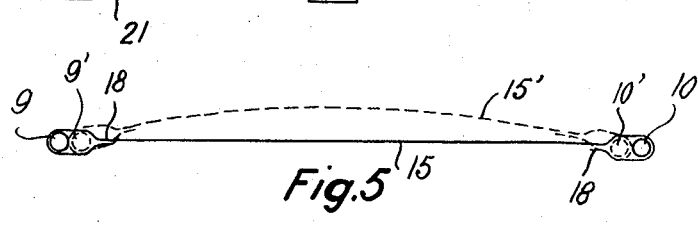
Fig. 5 is a diagrammatic sectional view on a smaller scale showing the assembly of the band of natural or synthetic textile material which connects the lateral uprights of the back portion, and the position (in chain lines) of the said band under the influence of the passenger's weight.

The uprights 9 and 10 are connected to one another by a band 15; Fig. 5 shows in chain lines at 15' the position of the band when the two uprights 9 and 10 occupy the positions 9' and 10' under the influence of the passenger's weight. The passenger's body actually bears against the fabric 16 (Fig. 6) which surrounds the uprights 9 and 10 and also the rods 11 and 17.

The fabric cover 16 bears on the band 15, which is made of a natural or synthetic textile material of excellent strength with stitching 18 which is executed with particular care. This stitching is intended to hold in position the loops which extend about the uprights 9 and 10.

The device operates in the following manner:

When, under the influence of inertia stresses or merely of a relaxation of the passenger's body, the weight of said body bears against the back portion, the elastic elements which may exist independently of the invention in the inside of the fabric 16 and the band 15 enable this back portion to adapt itself exactly to the shape of the body. Under the influence of the weight the band 15 takes up the position 15′ shown in chain lines and the uprights 9 and 10, which are not prevented from approaching one another by any rigid cross strut, now approach one another and occupy the positions 9′ and 10′.

The elasticity of the uprights 9 and 10 is ensured by the torsion bars which are constituted by the horizontal side parts 1 of the base frame. This elasticity is therefore excellent, since the said side parts are from 300 to 400 mm. in length, this figure being given by way of example to show how members are made to operate which ordinarily are inert and serve only as stationary rest elements.

However, the presence of the cross strut 3 limits the torsion to a permissible value, so as not to increase the slackening of the springs 5 to an exaggerated extent.

To sum up, the weight of the body, transmitted by the fabric 16 and the band 15 and also by any additional elastic system which does not enter into the invention, moves the uprights 9 and 10 towards one another, this movement being rendered elastic by the torsion of the side parts of the base frame 1. When the body of the passenger returns to the upright position or is slightly inclined forwards, the uprights 9 and 10 return to their original position, moving apart from one another.

Tests have shown that this seat system is particularly supple and comfortable, yet is economical, despite the slight thickness of the material constituting the fitting for the back of the seat.

The invention principally relates to an elastic framework system for the seats of automobile vehicles, wherein the lateral uprights of the back frame operate by flexing and the side elements of the base frame operate by torsion.

The invention further relates to a seat system wherein there is no rigid connecting member between the lateral uprights of the back portion. Moreover, it is pointed out that this seat exhibits undeniable safety properties since in the event of shocks, the bodies of the passengers sitting behind these seats do not strike up against any rigid bar when they are thrown forward against the back of the front seats.

The above description applies to a tubular seat which is particularly easy to produce as regards the patterning of the various elements in manufacture, but obviously uprights and framework elements of any other section, such as T, U, I, double T or Z sections, may be used.

I claim:

1. A self-sustaining complete seat for automobiles and like vehicles adapted to be supported solely by the floor of the vehicle and to support a person wholly independently of any other seat the vehicle may contain comprising, in combination, a pair of side rails adapted to rest on said floor of the vehicle, a cross rail interconnecting the front ends of said rails and forming a U-shaped unit therewith adapted to be secured directly to the floor, a pair of uprights each of which is an integral extension of one of said side rails, the uprights otherwise being independent of each other and free from rigid interconnection and forming extensions of the legs of said U-shaped unit, a U-shaped support member disposed above the front end of said side rails and inclined rearwardly toward said uprights, said support serving to receive and hold the seat portion of the seat, the rear end of said support being secured to said side rails, means extending upwardly from said side rails for connecting the front of said support thereto, flexible means extending between said uprights for movement forwardly and backwardly in response to forces exerted by the passenger's body against said flexible means, said flexible means being disposed to draw the free ends of said uprights toward one another when force is applied to said flexible means to move it rearwardly, and a cross strut rigidly connecting said side rails to hold them in spaced-apart relationship and serving to limit the torsion thereof and the maximum extent of approach of the uprights in response to movements of said flexible means.

2. A self-sustaining complete seat for automobiles and like vehicles adapted to be supported solely by the floor of the vehicle and to support a person wholly independently of any other seat the vehicle may contain comprising, in combination, a pair of side rails adapted to rest on said floor of the vehicle, an integral cross rail interconnecting the front ends of said side rails and forming a U-shaped unit therewith adapted to be secured directly to the floor, a pair of uprights each of which is an integral extension of one of said side rails, the uprights otherwise being independent of each other and free from rigid interconnection and forming extensions of the legs of said U-shaped unit, a U-shaped support member disposed above the front end of said side rails and inclined rearwardly toward said uprights, said support serving to receive and hold the seat portion of the seat, the rear end of said support being secured to said side rails, means extending upwardly from said side rails for connecting the front of said support thereto, flexible means extending between said uprights for movement forwardly and backwardly in response to forces exerted by the passenger's body against said flexible means, said flexible means being disposed to draw the free ends of said uprights toward one another when force is applied to said flexible means to move it rearwardly, and a cross strut rigidly connecting said side rails to hold them in spaced-apart relationship and serving to limit the torsion thereof and the maximum extent of approach of the uprights in response to movements of said flexible means.

3. A self-sustaining complete seat for automobiles and like vehicles adapted to be supported solely by the floor of the vehicle and to support a person wholly independently of any other seat the vehicle may contain comprising, in combination, a pair of side rails adapted to rest on said floor of the vehicle, an integral cross rail interconnecting the front ends of said side rails and forming a U-shaped unit therewith adapted to be secured directly to the floor, a pair of uprights each of which is an integral extension of one of said side rails, the uprights otherwise being independent of each other and free from rigid interconnection and forming extensions of the legs of said U-shaped unit, a U-shaped support member disposed above the front end of said side rails and inclined rearwardly toward said uprights, said support serving to receive and hold the seat portion of the seat, the rear end of said support being secured to said side rails, means extending upwardly from said side rails for connecting the front of said support thereto, flexible means in the form of a flexible band extending between said uprights for movement forwardly and backwardly in response to forces exerted by the passenger's body against said flexible band, said flexible band being disposed to draw the free ends of said uprights toward one another when force is applied to said flexible means to move it rearwardly, and a cross strut rigidly connecting said side rails to hold them in spaced-apart relationship and serving to limit the torsion thereof and the maximum extent of approach of the uprights in response to movements of said flexible means.

References Cited in the file of this patent

UNITED STATES PATENTS

| | | |
|---|---|---|
| 1,948,341 | Dujardin | Feb. 20, 1934 |
| 2,066,557 | Cox | Jan. 5, 1937 |
| 2,260,352 | Trapani | Oct. 28, 1941 |
| 2,521,339 | Burn | Sept. 5, 1950 |

FOREIGN PATENTS

| | | |
|---|---|---|
| 23,629 | Great Britain | Oct. 18, 1913 |
| 340,807 | Italy | May 28, 1936 |
| 578,905 | Germany | June 19, 1933 |
| 997,140 | France | Sept. 5, 1951 |